April 29, 1930.  J. R. WOOD  1,756,776
MOLDING MACHINE
Filed June 2, 1926  4 Sheets-Sheet 1

Inventor
John R. Wood
By Joseph W. Hazell
Attorney

April 29, 1930.　　　J. R. WOOD　　　1,756,776
MOLDING MACHINE
Filed June 2, 1926　　4 Sheets-Sheet 3

Inventor
John R. Wood,
By Joseph W. Hazell
Attorney

April 29, 1930.  J. R. WOOD  1,756,776
MOLDING MACHINE
Filed June 2, 1926  4 Sheets-Sheet 4
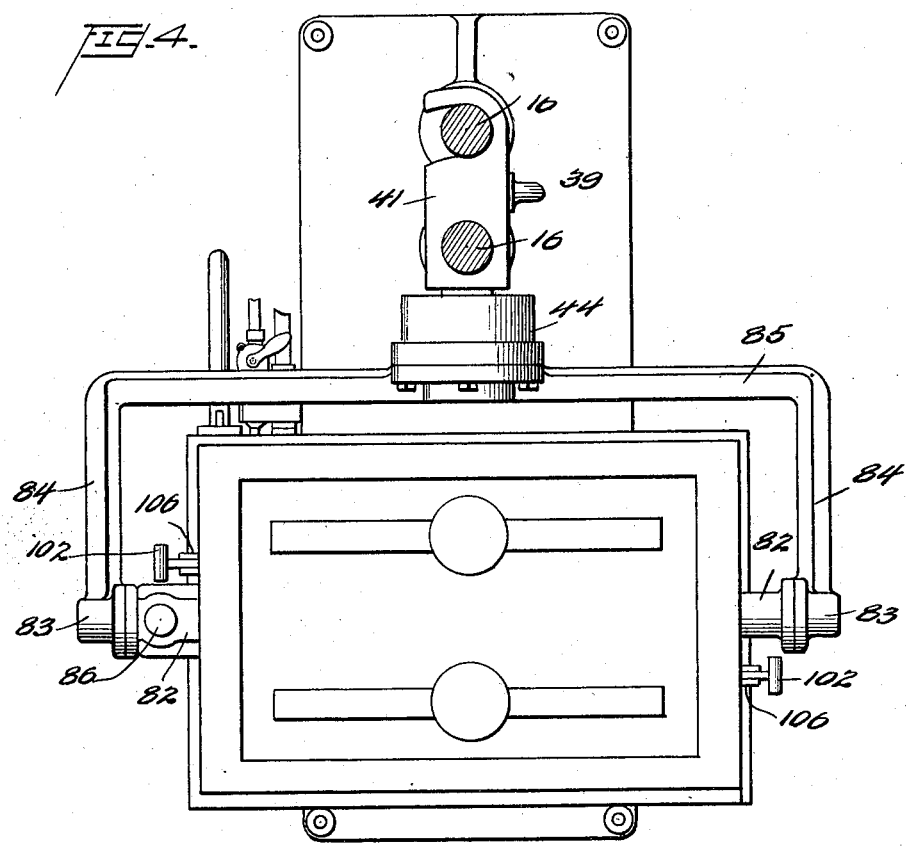
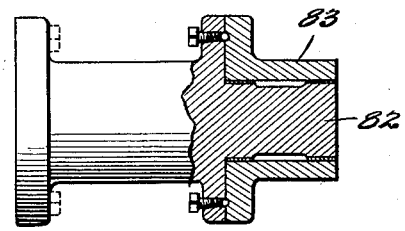
Inventor
John R. Wood,
By Joseph W. Hazell
Attorney Patented Apr. 29, 1930

1,756,776

UNITED STATES PATENT OFFICE

JOHN RICHARD WOOD, OF HATBORO, PENNSYLVANIA, ASSIGNOR TO NEW PROCESS MULTI-CASTINGS COMPANY, A CORPORATION OF NEW JERSEY

MOLDING MACHINE

Application filed June 2, 1926. Serial No. 113,111.

The present invention relates to molding machinery, and more particularly to a machine for making two parts of a mold simultaneously.

It is one of the objects of the invention to provide a machine by which a series of identical molds may be made with a single flask, and by which the pattern impressions are formed in both of the two mold sections simultaneously.

It is a further object of the invention to provide a machine by which the pattern impressions in both halves of a two part mold are formed simultaneously by jolting.

A still further object of the invention is to provide such a machine by which the number of operations heretofore required for making a complete mold, and the time required therefor, are materially reduced.

Other objects and advantages of the invention will appear from the following description, taken in connection with the accompanying drawings, which illustrate by way of example, a preferred form of machine embodying the invention. The machine as illustrated in the drawings is shown by way of example, and not as a definition of the limits of the invention, reference being had to the appended claims for that purpose.

Of the drawings:

Fig. 4 is a top plan view of the machine of Fig. 1; and

Fig. 5 is an enlarged detail view, partly in section.

Figure 1:
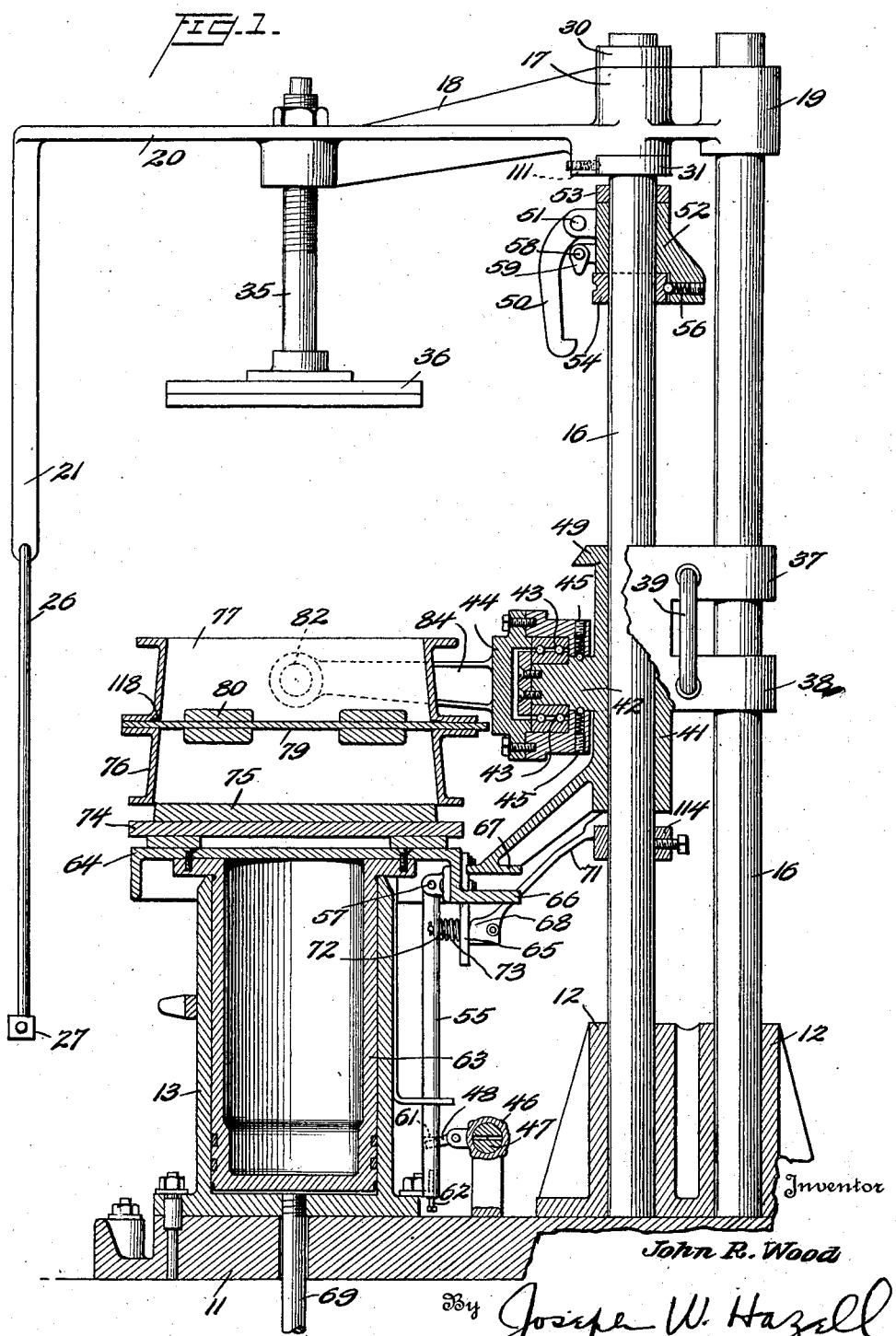
Fig. 1 is a side elevation, partly in section, of a preferred form of embodiment of the machine of the present invention.

Referring in detail to the accompanying drawings, which illustrate, by way of example, a preferred embodiment of the present invention, a bed plate 11 is provided on and anchored to any suitable foundation such, for example, as a concrete block. Fixed on the bed plate 11, and extending upwardly therefrom, are a standard support 12 and a stationary table cylinder 13. Fixed within the standard support 12 are vertically extending standards 16, on the top of one of which is rotatably mounted the sleeve portion 17 of a squeeze head arm 18, which is provided with the substantially horizontal squeeze head carrying portion 20 and with the downwardly extending end portion 21, to the lower end of which is pivotally secured a bracing and securing rod 26, whose lower end is provided with a lug engaging member 27, for a purpose hereinafter described. Associated with the sleeve portion 17 of the squeeze head arm is an upper bearing collar 30 and a lower bearing collar 31, which collars are fixed upon the forward standard 16. The sleeve portion 17 is provided with the rearwardly extending, standard embracing portion 19, which is cut out as shown particularly in Fig. 4 to embrace the rear standard 16 in one position of the squeeze head arm 18, that is, when the squeeze head 36 is in vertical alignment with the flask parts and table hereinafter described. The standard embracing portion 19 of the squeeze head arm serves to steady and brace the squeeze head arm when pressure is exerted thereon as hereinafter described. Adjustably carried in the squeeze head arm 18, and projecting downwardly therefrom, is a squeeze head adjusting and supporting shaft 35 removably carrying at its lower end the squeeze head 36. The squeeze head 36 is thus adapted to be moved in a horizontal plane about the forward standard 16 as an axis.

Slidably mounted on the forward standard 16 is a flask supporting sleeve block 41 having preferably formed integral therewith and projecting horizontally therefrom an arbor 42. Rotatably mounted on the arbor 42 by ball bearings 43, or otherwise, is a flask supporting arm 44, which is accurately positionable either in upright or inverted position by means of one or more ball stops 45, each of which is adapted to project into either of a pair of hemispherical depressions formed 180 degrees apart in the arbor 42. The sleeve block 41 is preferably formed rearwardly with a pair of rear standard embracing portions 37 and 38 preferably formed integrally with the block 41 and cut out as shown in Fig. 4 to embrace the rear standard 16 in one position of the flask as hereinafter described. The sleeve block 41 is also preferably formed with the handle or gripping portion 39, which serves, not only to connect the standard embracing portions 37 and 38, but also as a handle to assist in rotating the sleeve block 41 and flask supporting arm 44 about the forward standard 16 as an axis, as hereinafter described.

The sliding sleeve block 41 is provided at its upper end with a beveled latch portion 49, which is adapted in the uppermost position of said sliding block to be engaged by a swinging downwardly extending hook 50 pivoted at 51 to a hook support 52 rotatably, but non-slidably, mounted on the forward standard 16 and held against axial movement thereon by means of upper and lower fixed bearing collars 53 and 54, one of which may be provided with hemispherical depressions for the reception of a portion of a spring pressed ball stop 56 provided on the hook block 52 for the purpose of accurately positioning said hook block in one or more positions with respect to the forward standard 16. Means are provided for releasing the latch 49 by outward movement away from the standard of the hook 50, and for this purpose a rotatable cam shaft 58 is provided on the hook block 52 and has affixed thereon a cam 59 adapted on rotation of said shaft by its handle 60 to engage and cam outwardly the hook 50, thus releasing the sleeve block 41 and permitting it to move downwardly.

Associated with the stationary cylinder 13 is a vertically movable, but non-rotatable, piston 63 provided with the horizontal table top 64, and also provided with the horizontally extending lifting shoulder 66 adapted to be engaged by the downwardly extending lifting arm 67 fixed at its upper end to the rotatable sleeve block 41.

The piston 63 and the cylinder 13 are assembled to form an expansible chamber provided with an inlet pipe 69 leading to any source of suitable pressure exerting fluid such as compressed air, whose inlet to and exhaust from the expansible chamber may be controlled by any suitable form of hand operated valve. In the present embodiment of the machine, the table 64 is adapted to act as an automatic jolt table, and for this purpose is shown provided with automatic mechanism for alternately admitting to the expansible chamber air under pressure, and exhausting such air quickly, thus letting the table down suddenly for the jolt, the automatic mechanism causing these operations to be repeated until sufficient jolting has occurred.

In the present form of machine there is illustrated an automatically operated jolt valve similar to the valve and actuating mechanism shown in my copending application Serial No. 113,113 filed June 2, 1926. A valve casing 46 is provided, in which a valve 47 is operated by a lever 48. To actuate the lever 48 an arm 55 is pivoted at 57 on the table 64, and is slotted at its lower end as shown at 61 in Fig. 1 to receive the lever 48. An adjusting screw 62 projects upwardly into the slot 61 to engage the under side of lever 48 when the table has been raised the desired height for jolting, and, moving upwardly with the table, moves the lever 48 to release or exhaust the air in the expansible chamber. Air under pressure from any suitable source is delivered, for jolting, to the cylinder inlet pipe 69 through the valve 46 by any suitable form of piping, not shown, and controlled by any known, usual or suitable form of control valve, not shown, located between the jarring valve 46 and the air supply. The operation of the valve 46 is as follows: With the parts in the position of Fig. 1, air is admitted to valve 46, which, in the position shown, admits air through pipe 69 to cylinder 13, causing lifting of the piston 63 and table 64. With the lever 71 and arm 55 in the jarring position, shown in Fig. 1, as the table is raised, arm 55 and set screw 62 will be lifted until the set screw 62 engages the under side of lever 48, and raises said lever, turning it clockwise about its pivot as viewed in Fig. 1. This movement of lever 48 cuts off the supply of air to the cylinder, and permits the air in said cylinder to exhaust suddenly. This produces the sudden, downward jolting movement of the table. In the lowermost position of the table, however, the lever 48 has been engaged by the upper end of slot 61, and shifted back again to the air admitting position shown in Fig. 1. This causes the table to be raised promptly after the jolt.

Figure 3:
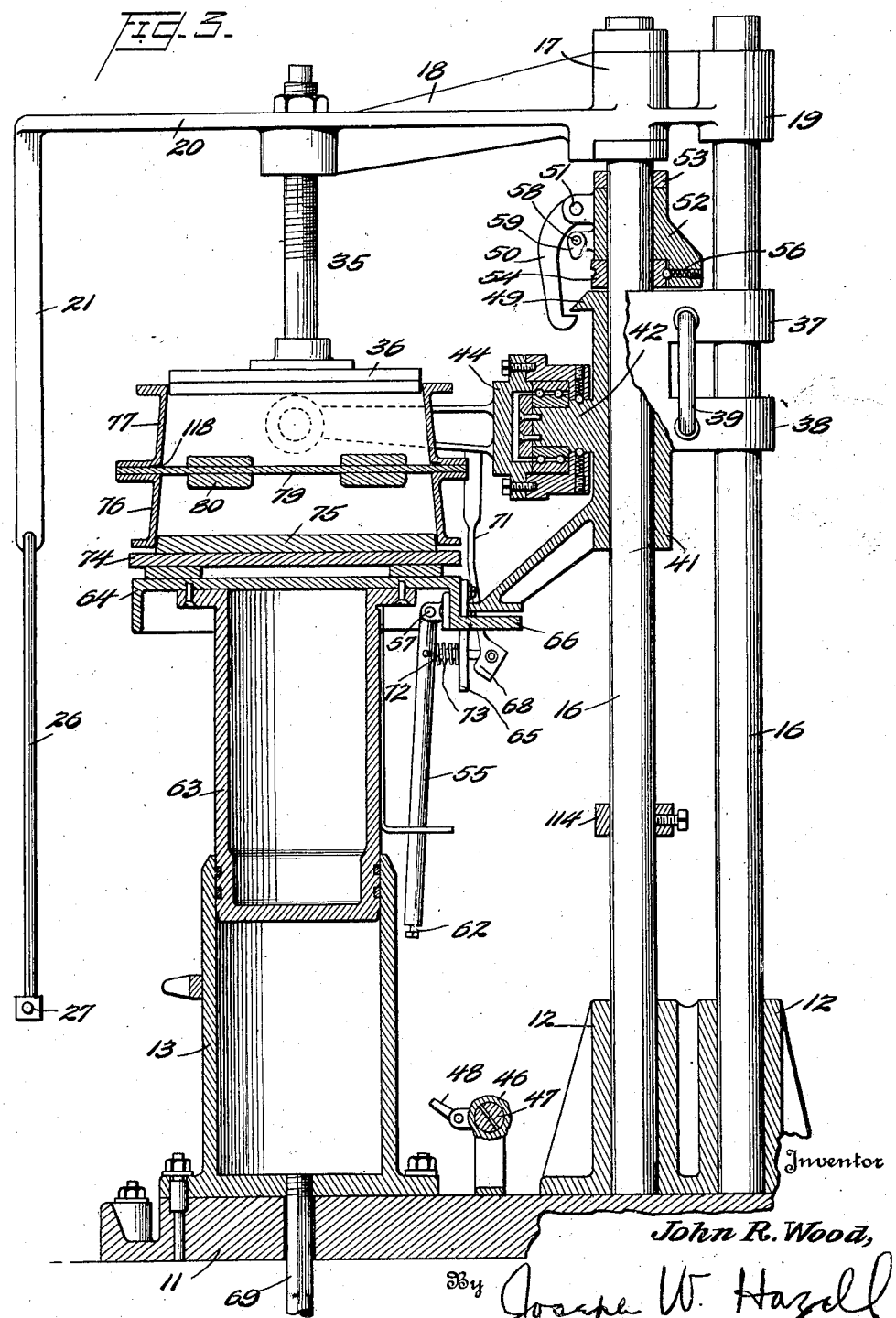
Fig. 3 is a side elevation similar to Fig. 1, but showing parts in different positions.

Means are provided for moving the arm 55 to operative or inoperative position, and for this purpose the table top 64 is provided with a downwardly extending cam plate 65, and on this cam plate bears a cam 68 formed on a manually operable jolt handle or lever 71 pivotally attached to one end of a horizontal link 72 which passes loosely through the cam plate 68 and whose other end is pivoted to the arm 55. A coil spring 73 under compression encircles the link 72 between arm 55 and cam 68. It will thus be evident that in the lower position of the jolt lever 71, as shown in Fig. 1, the cam 68 has drawn the arm 55 in position operatively to receive lever 48 and cause automatic and repeated operation of the jolt valve; and that in the raised position of jolt lever 71, the spring 73 causes arm 55 to move inwardly toward the table cylinder, clear of lever 48, as shown in Fig. 3 so that the table 64 may be raised or lowered by any standard, usually a convenient or desired form of raising and lowering valve well known in the art, as far as may be desired, and without jolting. When it is desired to lift the table 64 without jarring, lever 71 is manually rotated about its pivot, the cam 68 slides on surface 65 to permit spring 73 to urge arm 55 about its pivot 57 toward the left, as viewed in Fig. 1, thereby moving the slotted end of arm 55 free of lever 48, and permitting the table 64 to move upwardly as far as desired, on admitting air through valve 46 to cylinder 13, without automatically cutting off the air supply, and exhausting the air to produce a jolt. When automatic and continuous jolting is desired, when the table is lowered, the lever 71 is manually moved to the position of Fig. 1, camming arm 55 to the position of Fig. 1 to bring its slotted end into operative relation with the valve control lever 48. With the parts in this position, automatic and repeated jolting of the table 64 will, upon admission of air to valve 46, occur as above described.

A bottom board 74 is provided having on its underside the usual cross pieces and having on its upper side a plate 75, which is adapted under certain conditions to enter the interior of a drag member 76 forming part of the flask, of which the cope member 77 is removably attached by bolts or otherwise to the flask arm 44. The flask is preferably attached to arm 44 by arbors 82 formed on or attached to, and extending laterally from the sides or ends of the cope 77, which arbors are revolubly received by bearings 83 formed at the outer ends of parallel flask embracing arms 84 extending from a common horizontal member 85 formed on or adjustably attached to the arm 44, all as shown in Figs. 4 and 5.

A pattern plate 79 provided with patterns 80 is preferably permanently mounted on the machine, the word "permanently" being used in the sense that during the making of a given series of molds for a particular job, the pattern plate is attached to the machine and remains attached thereto until completion of as many molds as may be required. Thereafter it may be removed and a new pattern plate substituted. The same is true of the flask parts 76 and 77.

Figure 2:
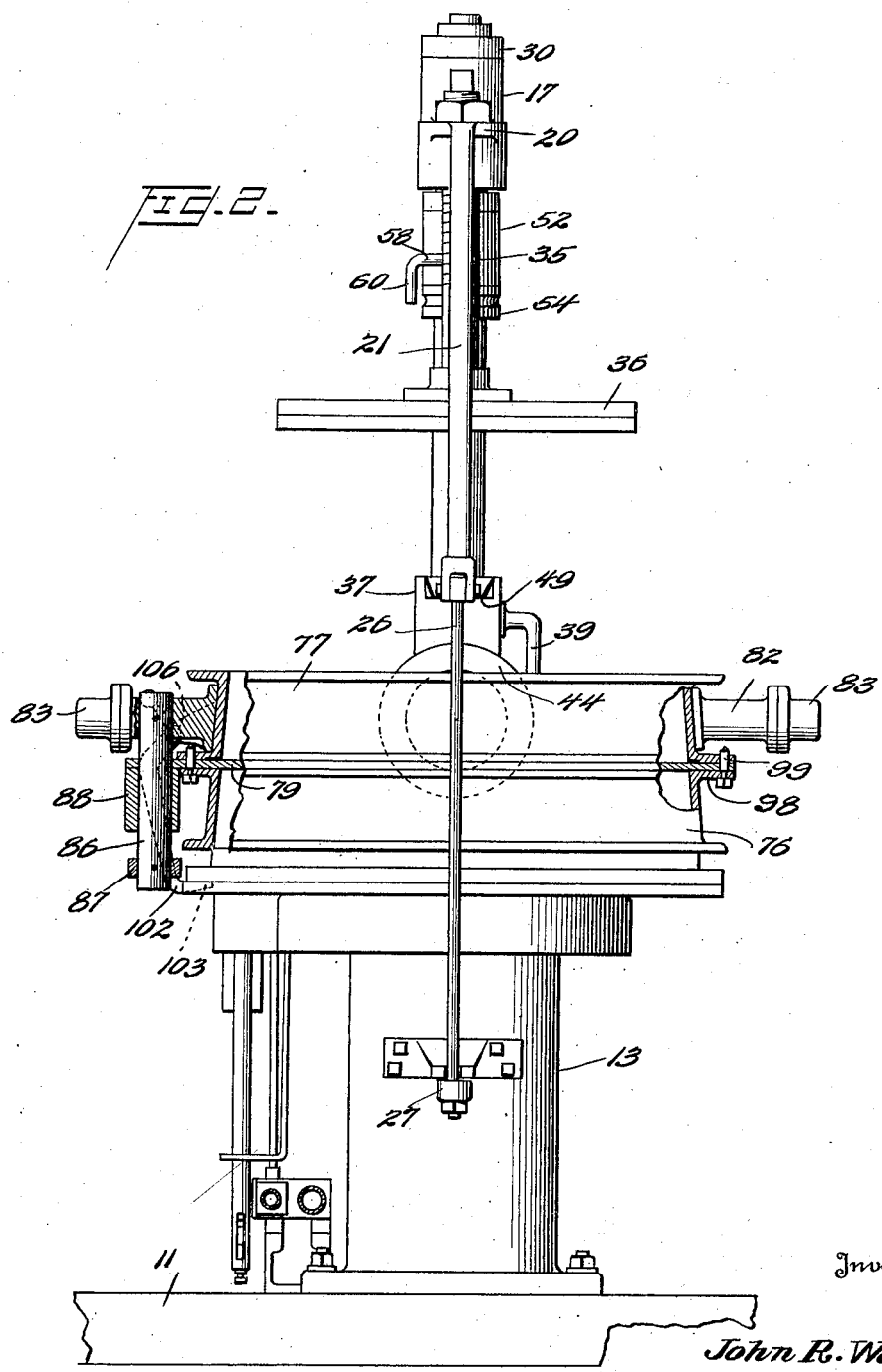
Fig. 2 is a front elevation thereof.

The machine of the present invention provides suitable pattern drawing means and, as illustrated in the present embodiment, as shown in the drawings and particularly Figs. 2 and 4, the cope 77 or its arbor 82, is provided with the downwardly extending shaft 86 provided at its lower end with a fixed collar 87. Journaled on the shaft 86 is a sleeve 88, to the upper end of which is fixed the pattern plate 79. The sleeve 88 and collar 87 are spaced apart sufficiently to permit the sleeve 88, carrying with it the pattern plate 79, to move downwardly on the shaft 86 far enough to withdraw the patterns 80 clear of the cope mold and thus to permit the pattern plate 79 on the sleeve 88 to be swung in a horizontal plane about the shaft 86 away from its position over the table 64.

For the purpose of accurately positioning the flask parts and pattern plate in assembled relation, the drag member 76 is provided with laterally extending lugs 98 carrying pins 99, which are adapted to pass through corresponding openings provided in the pattern plate 79 and also in the lower portion of the cope member 77.

For the purpose of securing the bottom board 74 and drag member 76 to the cope member 77 with the pattern plate 79 between the cope and drag and with all these parts in fixed relation with respect to each other, a plurality of bottom board retaining hooks 102 may be provided having lower hook portions adapted to engage beneath the bottom board 74 and pivoted intermediate their ends to the cope member 77. These retaining hooks may be the same as or similar to the retaining hooks shown in my copending application Serial No. 113,110, filed June 2, 1926, and are not herein shown in detail.

For the purpose of accurately positioning the squeeze head 36 in vertical alignment with the flask parts, a ball positioning stop 111 may be provided for cooperation with suitably located hemispherical depressions formed in the fixed bearing collar 31. For the purpose of locating the flask parts in proper position with respect to the table 64, positioning lugs may be provided on the sleeve block 41 and fixed collar 114.

The operation of the foregoing machine in carrying out the process of the present invention is as follows:

Assuming the flask parts to be in the inverted position with the pattern plate 79 therebetween, and resting upon the lowered table top 64, with the squeeze head 36 swung out of vertical alignment, since it is not required in practicing the process of the present invention, the drag member of the flask is filled with molding sand and the surplus struck off even with the bottom edges of the drag. Thereupon, the bottom board 74 is placed upon the exposed sand of the drag member with the plate 75 in position to enter the drag member under jolting pressure and compress the sand therein, the bottom board being held in position by the bottom board retaining hooks 102.

The table 64 is then jolted, and the sand is then packed downwardly in the drag against the patterns 80. At this time, the plate 75 may partly enter the drag. The bottom board being held fast by the beveled hooks 102, or by any other suitable means, the flask is rolled over, either about the arbors 82 or arbor 42, this movement bringing the flask to upright position, as shown in Fig. 1. It will be understood that in rolling over the flask, the jolt lever 71 is moved to inoperative position, the table 64 raised, and the flask lifted until hook 50 engages latch 49, the table being then lowered for clearance and the flask rolled over. When the flask has been brought to its upright position, the table is again raised to the bottom board, the hook 50 released and the table lowered with the flask on it in upright position. The cope is then filled with sand and the table is again jolted. At this time it will be observed that the cope and drag are both jolted in assembled position with the pattern plate between the flask parts. The sand in the cope is packed downwardly against the cope patterns, and the whole flask and pattern plate are jolted downwardly upon the drag mold sand, until the lower drag edges contact with the bottom board, and the plate 75 has entered as far as it will go, into the drag. It will also be understood that plates 75 of different thicknesses may be used where required.

When the jolting is completed, the table is raised until hook 50 engages latch 49 and holds the flask in raised position.

The hooks 102 are now moved to inoperative position to release the bottom board, and after the use of a vibrator, if desired, the table is lowered to draw the pattern. The cope is held in raised position at this time, and the sand is retained in the cope by suitable sand slides such as those shown in my United States Patent No. 1,676,199, granted July 3, 1928, but not completely illustrated herein, being merely indicated at 118. As the table is lowered, it carries downwardly with it the bottom board 74, the plate 75, the filled drag member 76, and the pattern plate 79, the latter of which rides downwardly on the drag until it is stopped by the collar 87, this stop being held stationary as it is fixed to the cope, which at this time is being held in its uppermost position. After the pattern plate has been stopped, the table continues its downward movement and carries downwardly with it the drag. As soon as the pattern plate is clear of the mold parts, it may be swung aside in a horizontal plane about its pivot 86. The mold is then closed by raising the table until the drag mold contacts with the cope mold, whereupon the cope sand-retaining slides 118 are moved outwardly to release the sand in the cope, and the table is again lowered with the cope retained in its uppermost position, and the table carrying downwardly with it the drag 76 with the drag mold contained therein and the cope mold resting on the drag mold in assembled position. The drag may then be lifted off the mold and the bottom board 74 removed with the mold resting thereon. A pouring jacket may be slipped over the mold, and the casting poured. Meanwhile the flask parts and pattern plate are reassembled in a manner which will be obvious from the above description, and the parts are then in position for the making of another mold.

It will be obvious from the foregoing that the present invention provides a machine for jolting the cope mold and drag mold simultaneously, with the flask parts in assembled position and a pattern plate therebetween. The preliminary jolting of the drag mold in inverted position need not be necessary, particularly as the thickness of plate 75 may be varied as may be desired, but this preliminary jolting assists in giving an initial compression to the sand.

It will also be obvious that the machine herein illustrated, though capable of carrying out the process of the present invention, is also capable of other uses, and carrying out other processes, as will readily be apparent to those skilled in the art, and for a disclosure and explanation of some of said other uses and processes, reference is made to my copending application Serial No. 113,110 filed June 2, 1926.

It will be understood that various changes and modifications may be made in the foregoing machine, and in the process herein described and claimed, all within the spirit and scope of the invention as defined by the appended claims.

What is claimed is:

1. A molding machine including, in combination, a sectional flask rotatably associated with said machine, and comprising a cope member and a drag member, a pattern plate movably associated with said machine, and means on said machine for simultaneously packing a cope mold and a drag mold against opposite sides of said pattern plate by jolting.

2. A molding machine including a flask carrying standard, a flask mounted slidably and rotatably thereon, a flask guiding standard and a flask stopping and guiding element movable with said flask for embracing said second named standard in one position of said flask and swinging clear of said standard in another position of said flask, and means for raising and lowering said flask on said first named standard while said guiding element embraces said second named standard.

3. A molding machine including a squeeze head carrying standard, a squeeze head rotatably carried by said standard, a flask movably carried by said standard for cooperation with said squeeze head, a second standard, and a squeeze head stopping abutment element movable with said squeeze head for embracing said second standard in one position of said squeeze head and thereby bracing said squeeze head in that position, said abutment element moving clear of said second named standard in another position of said squeeze head.

4. A molding machine including, in combination, a molding flask comprising a cope and a drag, flask embracing arms in which said flask is rotatably mounted, means rotatably securing said flask embracing arms to said machine, means for raising and lowering said flask embracing arms, a pattern plate between the cope and drag, and means for compressing molding material in both cope and drag simultaneously by jolting.

5. A molding machine including, in combination, a molding flask comprising a cope and a drag, an operating table, a pattern plate and means for jolting sand simultaneously in both cope and drag against said pattern plate.

6. A molding machine including, in combination, a sectional flask rotatably associated with said machine and comprising a cope member and a drag member, a pattern plate movably associated with said flask, and means for jolting cope molding sand in said cope downwardly against said pattern and simultaneously jolting said pattern downwardly against drag molding sand in said drag.

7. A molding machine including, in combination, a sectional flask movably associated with said machine and comprising a cope member and a drag member, a pattern plate removably associated with said flask, means for jolting cope molding sand in said cope downwardly against said pattern and simultaneously jolting said pattern downwardly against drag molding sand in said drag, and means for drawing said pattern.

8. A molding machine including, in combination, a movable member, a sectional flask rigidly secured thereto and comprising a cope member and a drag member, a pattern plate removably associated with said flask, means for jolting cope molding sand in said cope downwardly against said pattern and simultaneously jolting said pattern downwardly against drag molding sand in said drag, and means for stripping said flask off its mold.

9. A molding machine including, in combination, a sectional flask rotatably associated with said machine, and comprising a cope member and a drag member, a pattern plate movably associated with said machine, means on said machine for simultaneously packing a cope mold and a drag mold against opposite sides of said pattern plate by jolting, means for drawing said pattern and means for stripping said flask off its mold.

10. A molding machine including, in combination, a sectional flask rotatably associated with said machine and comprising a cope member and a drag member, a pattern plate mounted for pivotal movement on said cope member, means for jolting cope molding sand in said cope downwardly against said pattern plate and simultaneously jolting said pattern downwardly against drag molding sand in said drag.

In testimony whereof I affix my signature.

JOHN RICHARD WOOD.